(12) United States Patent
Yamamoto et al.

(10) Patent No.: US 6,999,246 B2
(45) Date of Patent: Feb. 14, 2006

(54) IMAGE SCANNING LENS AND IMAGE SCANNING DEVICE THAT USES SAME

(75) Inventors: Yoko Yamamoto, Fuchu (JP); Hiromitsu Yamakawa, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/045,364

(22) Filed: Jan. 31, 2005

(65) Prior Publication Data
US 2005/0180027 A1   Aug. 18, 2005

(30) Foreign Application Priority Data
Feb. 18, 2004 (JP) .............................. 2004-040711

(51) Int. Cl.
G02B 15/14 (2006.01)
G02B 9/34 (2006.01)

(52) U.S. Cl. ...................................... 359/781; 359/771
(58) Field of Classification Search ........ 359/781–782, 359/770–771, 776, 753, 714, 715, 686, 738–740
See application file for complete search history.

(56) References Cited

U.S. PATENT DOCUMENTS 6,239,921 B1 * 5/2001 Isono .......................... 359/770

6,775,074 B2 * 8/2004 Kasahara .................... 359/781

FOREIGN PATENT DOCUMENTS

| JP | H5-264900 | 10/1993 |
| JP | H9-127414 | 5/1997 |

* cited by examiner

Primary Examiner—Georgia Epps
Assistant Examiner—Alicia M Harrington
(74) Attorney, Agent, or Firm—Arnold International; Jon W. Henry; Bruce Y. Arnold

(57) ABSTRACT

An image scanning lens includes four lens components that may include five lens elements as follows: a first lens element having negative refractive power and a meniscus shape with its convex surface on the object side, a second lens element having positive refractive power and a meniscus shape with its convex surface on the object side, a stop, a third biconcave lens element cemented to a fourth biconvex lens element, and a fifth lens element having negative refractive power and a meniscus shape with its concave surface on the object side. The image scanning lens satisfies certain conditions related to the focal lengths of the first, second, and third lens components of the image scanning lens and to the anomalous dispersion of the second lens element. An image scanning device, such as an image scanner, with an image pickup device, such as a CCD, uses the image scanning lens.

20 Claims, 4 Drawing Sheets

IMAGE SCANNING LENS AND IMAGE SCANNING DEVICE THAT USES SAME

FIELD OF THE INVENTION

The present invention relates to an image scanning lens and an image scanning device for reading an image on a manuscript, such as a facsimile machine or an image scanner, and particularly relates to an image scanning lens with a four-component, five-element construction that is suitable for use in reading a color image as part of an image reading device.

BACKGROUND OF THE INVENTION

Image scanning devices in which an image on a manuscript is formed on an image pickup device, such as a CCD, via an optical system in order to convey the image information are known. Recently, miniaturization and low cost have been required in such image scanning devices, especially in image scanners and similar devices, in turn making low cost and miniaturization of the image scanning lens highly desirable.

Various types of image scanning lenses used in image scanning devices, such as facsimile machines and image scanners, are known. For example, Japanese Laid-Open Patent Application H09-127414 and Japanese Laid-Open Patent Application H05-264900 disclose such image scanning lenses of four-component, five-element construction that are small and have low production costs.

However, recently, high resolution has become an urgent need in image scanning devices, such as facsimile machines and image scanners, tending to sharply increase the number of pixels needed in the image pickup devices. As the number of pixels is increased, the size of the image pickup element becomes larger, making it difficult to obtain an image scanning lens having desirable image magnification, a wide field of view, and sufficient miniaturization.

Additionally, because high precision has been increasingly required in reading color images, it is strongly desired to make an image scanning lens that can favorably correct aberrations related to color.

However, the half-field angles of the image scanning lenses described in the above mentioned Japanese Laid-Open Patent Application H09-127414 are relatively narrow, 18 to 20 degrees, which does not respond to the need for a wide angle of view. On the other hand, the half-field angles of the image scanning lenses described in Japanese Laid-Open Patent Application H05-264900 are relatively wide at about 23.5 degrees, but they are not necessarily sufficient in terms of the correction of lateral color to enable desired reading of color images.

BRIEF SUMMARY OF THE INVENTION

The present invention relates to an image scanning lens, and an image scanning device, such as a facsimile device or an image scanner, that uses it that provides excellent correction of chromatic aberration for reading color images, achieves a wide field of view, can be miniaturized, and can be produced at low cost.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

An image scanning lens and an image scanning device using an image scanning lens according to the present invention are described below with reference to the drawings.

Figure 6:
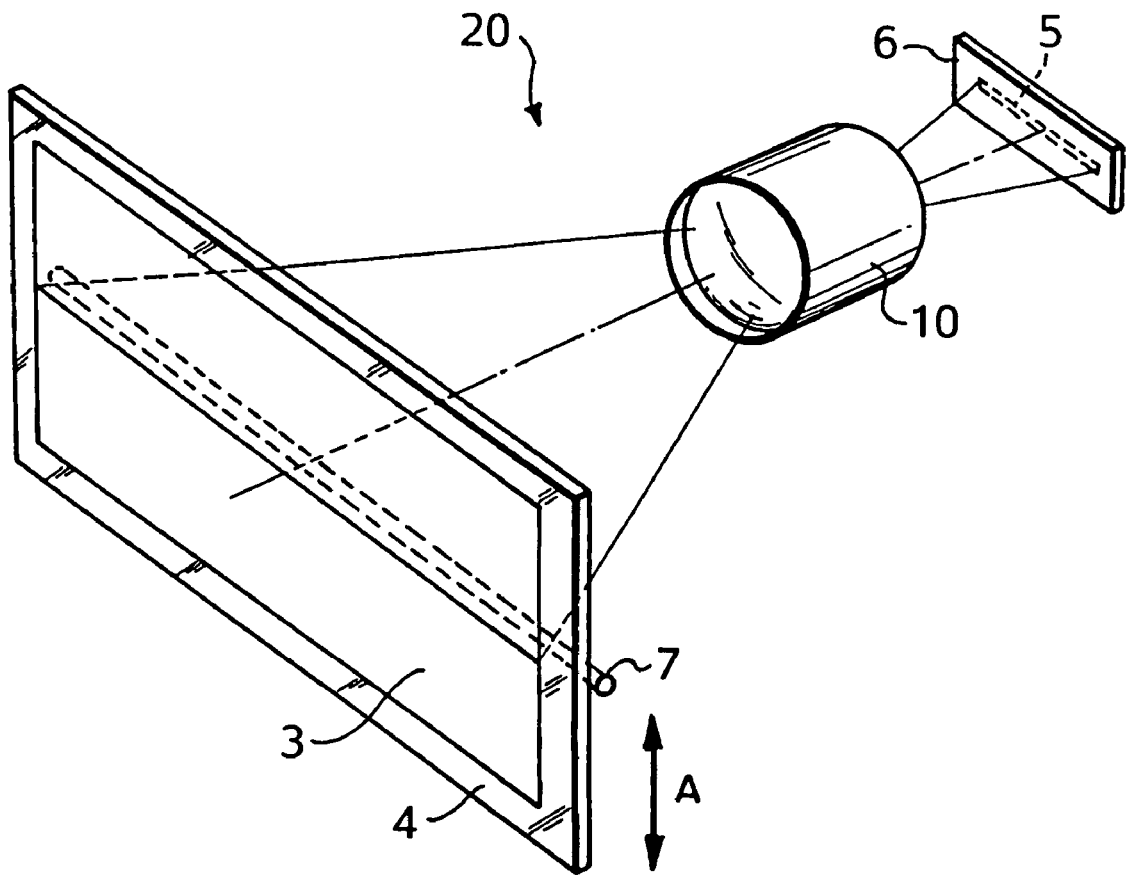
FIG. 6 shows a schematic perspective view of an image scanning device that uses an image scanning lens of the present invention.

FIG. 6 shows a schematic perspective view of an image scanning device 20, such as a facsimile machine or an image scanner, that uses an image scanning lens 10 of the present invention. The image scanning device 20 includes the image scanning lens 10 between a glass plate 4 on which an original document 3, such as a manuscript, is placed and a cover glass 6 that covers an image pickup device, such as a linear CCD 5 with CCD elements arranged in a linear pattern in a row or rows. Additionally, as shown in FIG. 6, an illuminator 7 is arranged between the glass plate 4 and the image scanning lens 10. The image on the original document 3 is scanned by moving the original document 3 in the direction of the double-headed arrow A perpendicular to the optical axis of the image scanning lens 10 and perpendicular to the line of the linear pattern of CCD elements of the linear CCD 5. The linear CCD 5 scans the line optically conjugate to it on the original document that intersects the optical axis of the image scanning lens 10. Thus, light reflected from the original document is focused by the image scanning lens to form a line image on the linear CCD 5 of an optically conjugate line on the original document.

Figure 1:
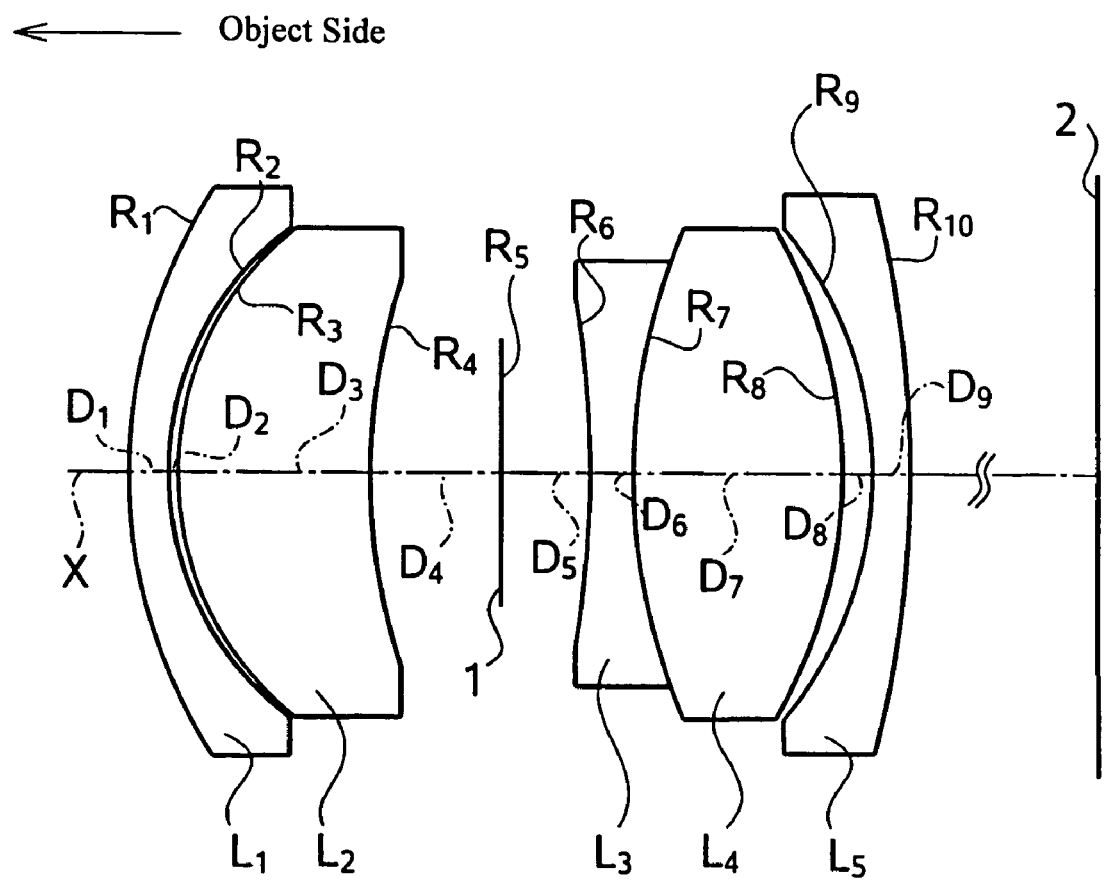
FIG. 1 shows a cross-sectional view of Embodiment 1 of the image scanning lens of the present invention.

A general description of the image scanning lens of the present invention that pertains to all four embodiments of the invention will first be described with reference to FIG. 1 that shows Embodiment 1. In FIG. 1, lens elements are referenced by the letter L with a subscript number denoting their order from the object side of the image scanning lens along the optical axis X, from $L_1$ to $L_5$. Similarly, radii of curvature of the surfaces of the lens elements and a diaphragm stop 1 that acts as an aperture stop are referenced by the letter R with a subscript number denoting their order from the object side of the image scanning lens, from $R_1$ to $R_{10}$. The on-axis surface spacings along the optical axis X of the various optical surfaces are referenced by the letter D with a subscript number denoting their order from the object side of the image scanning lens, from $D_1$ to $D_9$.

A horizontal arrow at the upper left of FIG. 1 that points left indicates the object side. The image scanning lens is designed so that a luminous flux of light travels from the object side of the image scanning lens to the image side of the image scanning lens in order to form an image on an image plane 2 where a CCD element (not shown) may be located.

Definitions of the terms "lens element" and "lens component" that relate to this detailed description will now be given. The term "lens element" is herein defined as a single transparent mass of refractive material having two opposed refracting surfaces, which surfaces are positioned at least generally transversely of the optical axis of the image scanning lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Thus, the present invention may variously be described in terms of lens elements or in terms of lens components. Commonly, a lens component may be formed of two or more lens elements by cementing the lens elements together.

The image scanning lens of the present invention includes four lens components made up of five lens elements, $L_1$ to $L_5$. A stop 1 is positioned between the second lens element $L_2$ and the third lens element $L_3$ and a light beam incident in the direction of the optical axis from the object side is processed by the image scanning lens to form an image on the image plane 2, as shown in FIG. 1.

More specifically, as shown in FIG. 1, the image scanning lens may include, in order from the object side: a first lens element $L_1$ having negative refractive power and a meniscus shape with its convex surface on the object side; a second lens element $L_2$ having positive refractive power and a meniscus shape with its convex surface on the object side; a stop 1; a third lens element $L_3$ that is biconcave; a fourth lens element $L_4$ that is biconvex; and a fifth lens element $L_5$ having negative refractive power and a meniscus shape with its concave surface on the object side. The third lens element and the fourth lens element are cemented together to form a single lens component, and each of the other lens elements forms a separate lens component so that the five lens elements together form four lens components. The lens components are also considered in order from the object side, so that the first lens component is the first lens element $L_1$, the second lens component is the second lens element $L_2$, the third lens component is formed of both the third lens element $L_3$ and the fourth lens element $L_4$, and the fourth lens component is the fifth lens element $L_5$.

All four preferred embodiments of the invention, Embodiments 1–4, that will be individually described below have the same construction as that explained in the previous paragraph.

The image scanning lens of the present invention is constructed to excellently correct chromatic aberration for reading color images and to achieve a wide field of view, and it can be miniaturized and produced at low cost.

In particular, constructing the image scanning lens of the present invention with the stop 1 inserted close to the center of a roughly symmetrically-shaped lens system enables improving the correction of chromatic aberration.

Additionally, preferably in the image scanning lens of the present invention, the following Conditions (1)–(4) are satisfied:

$0.22 < R_1/f < 0.28$        Condition (1)

$0.40 < f2/f < 0.51$        Condition (2)

$0.33 < f3/f < 0.42$        Condition (3)

$1.14 < R_8/R_9 < 1.31$        Condition (4)

where $R_1$ is the radius of curvature of the object-side surface of the first lens component, f is the focal length of the image scanning lens, f2 is the focal length of the second lens component, f3 is the focal length of the third lens component, $R_8$ is the radius of curvature of the image-side surface of the third lens component, and $R_9$ is the radius of curvature of the object-side surface of the fourth lens component.

Satisfying Condition (1) above improves the correction of distortion and lateral color. Specifically, if the upper limit of Condition (1) is not satisfied, distortion cannot be favorably corrected, and if the lower limit of Condition (1) is not satisfied, lateral color cannot be favorably corrected.

Satisfying Condition (2) above improves the correction of spherical aberration and lateral color. Specifically, if the upper limit of Condition (2) is not satisfied, lateral color cannot be favorably corrected, and if the lower limit of Condition (2) is not satisfied, spherical aberration cannot be favorably corrected.

Satisfying Condition (3) improves the correction of coma aberration and field curvature. Specifically, if the upper limit of Condition (3) is not satisfied, coma aberration cannot be favorably corrected, and if the lower limit of Condition (3) is not satisfied, the field curvature cannot be favorably corrected.

Satisfying Condition (4) improves the correction of spherical aberration and field curvature. Specifically, if the upper limit of Condition (4) is not satisfied, spherical aberration cannot be favorably corrected, and if the lower limit of Condition (4) is not satisfied, the field curvature cannot be favorably corrected.

Additionally, preferably the second lens component includes a lens element having positive refractive power and a meniscus shape with its convex surface on the object side and this lens element satisfies the following Condition (5):

$\theta_{gd} > -2.083 \cdot 10^{-3} \cdot v_d + 1.366$        Condition (5)

where $\theta_{gd} = (N_g - N_d)/(N_F - N_C)$, $N_g$ is the refractive index at the g-line (λ=435.83 nm) of the lens material of the lens element of the second lens component, $N_d$ is the refractive index at the d-line (λ=587.56 nm) of the lens material of the lens element of the second lens component, $N_F$ is the refractive index at the F-line (λ=486.13 nm) of the lens material of the lens element of the second lens component, $N_C$ is the refractive index at the C-line (λ=656.27 nm) of the lens material of the lens element of the second lens component, and $v_d$ is the Abbe number at the d-line (587.56 nm) of the lens material of the lens element of the second lens component.

Condition (5) above relates to anomalous dispersion of the lens material of the lens element of the second lens component. Axial chromatic aberration and lateral color can be favorably corrected by using such a lens material for the lens element $L_2$ of FIG. 1 and satisfying Condition (5) above.

Embodiments 1–4 of the present inventions will now be individually described with further reference to the drawings. In the following descriptions, references will be frequently made to a "lens element." However, as set forth above, it is understood that lens elements described below are also lens components and may be replaced by lens components that include more than one lens element. Additionally, in Embodiments 1–4, the data is based on a normalized focal length of 100 mm, but Embodiments 1–4 are actually to be used under optimum conditions related to manuscript size, resolution required, and other factors that vary with specific applications. Furthermore, all of Embodiments 1–4 have been designed using a design wavelength of 587.56 (the d-line).

Embodiment 1

FIG. 1 shows the basic lens element configuration of the image scanning lens of Embodiment 1.

Figures 2A, 2B, 2C, 2D:
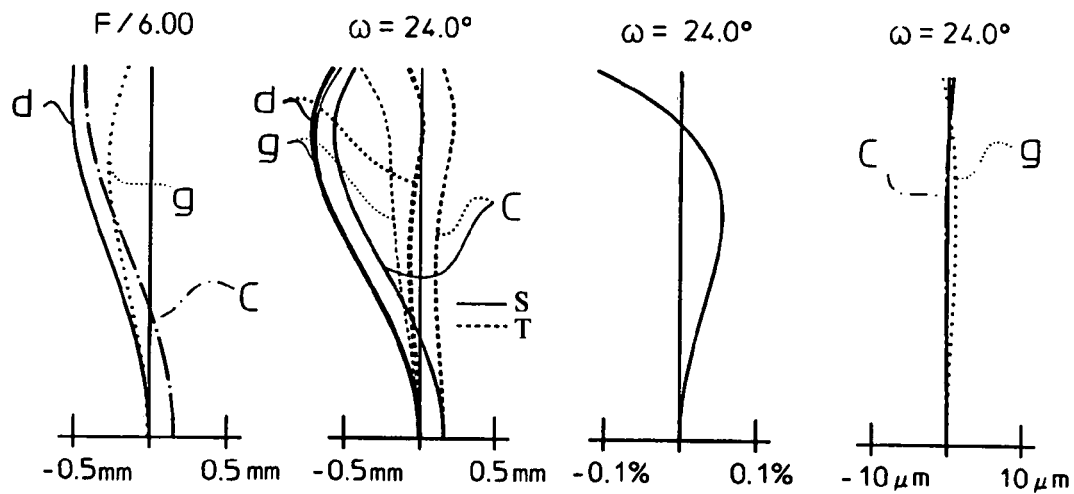
FIGS. 2A–2D show the spherical aberration, astigmatism, distortion, and lateral color, respectively, of the image scanning lens according to Embodiment 1.

Table 1 below lists the surface number # in order from the object side, the radius of curvature R (in mm) of each surface, the on-axis surface spacing D (in mm), the refractive index $N_d$ (at the d-line), the refractive index $N_g$ (at the g-line), the refractive index $N_F$ (at the F-line), the refractive index $N_C$ (at the C-line), the Abbe number $v_d$ (at the d-line), and the product name that the manufacturer (O'Hara) uses to identify the optical material used to make each lens element for Embodiment 1. Listed in the middle portion of Table 1 are the focal length f, the f-number $F_{NO}$, the magnification β, and the maximum field angle 2ω for Embodiment 1. Furthermore, listed in the bottom portion of Table 1 are the values corresponding to Conditions (1)–(5) for Embodiment 1.

based on the focal length being 100 mm and a plane parallel glass plate with a thickness of 5.84 mm being arranged in the optical path on the object side of the image scanning lens as well as a plane parallel glass plate with a thickness of 1.46 mm being arranged in the optical path on the image side of the image scanning lens. As shown in FIG. 2A, the spherical aberration is shown at an f-number, $F_{NO}$, of 6.00. In FIGS. 2A and 2B, aberrations are shown for the d-line, the g-line, and the C-line. In FIG. 2B, the astigmatism is shown for the sagittal image surface S and for the tangential image surface T for each wavelength. In FIG. 2C, distortion is shown for the d-line. In FIG. 2D, lateral color is shown for both the C-line and the g-line relative to the d-line. The half-field angle ω for FIGS. 2B–2D is 24.0°. As is apparent from these figures, the various aberrations are favorably corrected.

Embodiment 2

Embodiment 2 is very similar to Embodiment 1 and uses the same number of lens elements. Because Embodiment 2 is very similar to Embodiment 1, the differences between Embodiment 2 and Embodiment 1 will be evident from Table 2 that follows.

Table 2 below lists the surface number # in order from the object side, the radius of curvature R (in mm) of each surface, the on-axis surface spacing D (in mm), the refractive index $N_d$ (at the d-line), the refractive index $N_g$ (at the g-line), the refractive index $N_F$ (at the F-line), the refractive index $N_C$ (at the C-line), the Abbe number $v_d$ (at the d-line), and the product name that the manufacturer (O'Hara) uses to identify the optical material used to make each lens element for Embodiment 2. Listed in the middle portion of Table 2 are the focal length f, the f-number $F_{NO}$, the magnification

TABLE 1

| # | R | D | $N_d$ | $N_g$ | $N_F$ | $N_C$ | $v_d$ | Optical Material |
|---|---|---|---|---|---|---|---|---|
| 1 | 25.84 | 1.97 | 1.65412 | 1.67517 | 1.66571 | 1.64923 | 39.7 | S-NBH5 |
| 2 | 15.45 | 0.45 | | | | | | |
| 3 | 15.74 | 9.47 | 1.61800 | 1.63010 | 1.62479 | 1.61504 | 63.4 | S-PHM52 |
| 4 | 31.96 | 6.46 | | | | | | |
| 5 | ∞(stop) | 4.40 | | | | | | |
| 6 | −53.28 | 2.15 | 1.56384 | 1.57532 | 1.57029 | 1.56100 | 60.7 | S-BAL41 |
| 7 | 31.76 | 10.34 | 1.71300 | 1.72943 | 1.72221 | 1.70897 | 53.9 | S-LAL8 |
| 8 | −24.26 | 1.49 | | | | | | |
| 9 | −19.41 | 1.92 | 1.58144 | 1.59973 | 1.59149 | 1.57722 | 40.7 | S-TIL25 |
| 10 | −55.73 | | | | | | | | f = 100 mm $F_{NO}$ = 6.0 β = −0.255 2ω = 48.1°
Condition (1) value: $R_1/f$ = 0.26
Condition (2) value: f2/f = 0.41
Condition (3) value: f3/f = 0.40
Condition (4) value: $R_8/R_9$ = 1.25
Condition (5) value: $θ_{gd}$ = 1.241 ($v_d$ = 63.4)

Embodiment 1 satisfies Conditions (1)–(5).

FIGS. 2A–2D show the spherical aberration, astigmatism, distortion, and lateral color, respectively, of the image scanning lens of Embodiment 1. These aberration diagrams are β, and the maximum field angle 2ω for Embodiment 2. Furthermore, listed in the bottom portion of Table 2 are the values corresponding to Conditions (1)–(5) for Embodiment 2.

TABLE 2

| # | R | D | $N_d$ | $N_g$ | $N_F$ | $N_C$ | $v_d$ | Optical Material |
|---|---|---|---|---|---|---|---|---|
| 1 | 23.76 | 2.24 | 1.61772 | 1.63335 | 1.62641 | 1.61401 | 49.8 | S-BSM28 |
| 2 | 15.04 | 0.65 | | | | | | |
| 3 | 15.24 | 12.52 | 1.49700 | 1.50451 | 1.50123 | 1.49514 | 81.6 | S-FPL51 |
| 4 | 31.02 | 4.03 | | | | | | |
| 5 | ∞(stop) | 4.23 | | | | | | |
| 6 | −44.09 | 1.69 | 1.51742 | 1.52980 | 1.52431 | 1.51444 | 52.4 | S-NSL36 |

TABLE 2-continued

| # | R | D | $N_d$ | $N_g$ | $N_F$ | $N_C$ | $v_d$ | Optical Material |
|---|---|---|---|---|---|---|---|---|
| 7 | 34.79 | 9.90 | 1.71300 | 1.72943 | 1.72221 | 1.70897 | 53.9 | S-LAL8 |
| 8 | −23.74 | 1.62 | | | | | | |
| 9 | −19.09 | 1.88 | 1.56732 | 1.58423 | 1.57664 | 1.56339 | 42.8 | S-TIL26 |
| 10 | −50.29 | | | | | | | | f = 100 mm $F_{NO}$ = 6.0 β = −0.255 2ω = 48.2°
Condition (1) value: $R_1/f$ = 0.24
Condition (2) value: f2/f = 0.48
Condition (3) value: f3/f = 0.39
Condition (4) value: $R_8/R_9$ = 1.24
Condition (5) value: $θ_{gd}$ = 1.233 ($v_d$ = 81.6)

Embodiment 2 satisfies Conditions (1)–(5).

Figures 3A, 3B, 3C, 3D:
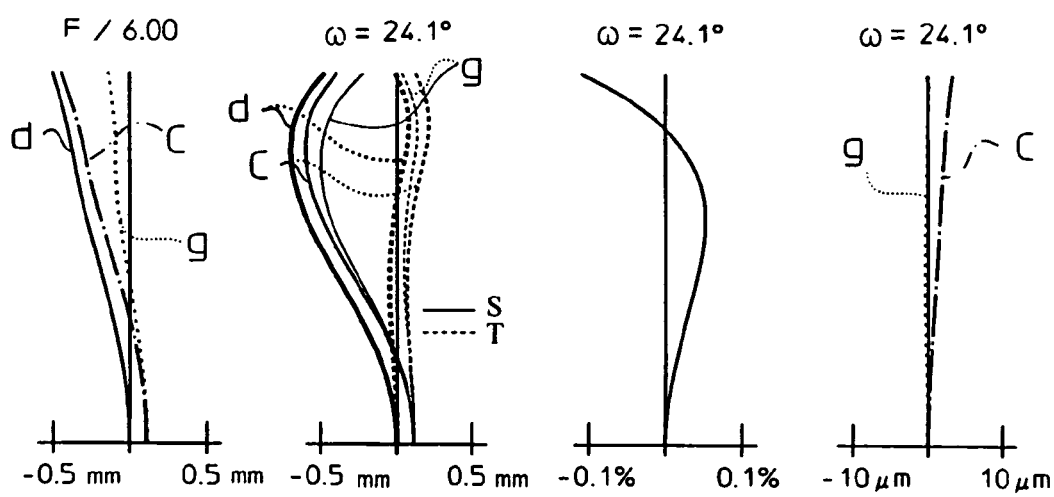
FIGS. 3A–3D show the spherical aberration, astigmatism, distortion, and lateral color, respectively, of the image scanning lens according to Embodiment 2.

FIGS. 3A–3D show the spherical aberration, astigmatism, distortion, and lateral color, respectively, of the image scanning lens of Embodiment 2. These aberration diagrams are based on the focal length being 100 mm and a plane parallel glass plate with a thickness of 5.84 mm being arranged in the optical path on the object side of the image scanning lens as well as a plane parallel glass plate with a thickness of 1.46 mm being arranged in the optical path on the image side of the image scanning lens. As shown in FIG. 3A, the spherical aberration is shown at an f-number, $F_{NO}$, of 6.00. In FIGS. 3A and 3B, aberrations are shown for the d-line, the g-line, and the C-line. In FIG. 3B, the astigmatism is shown for the sagittal image surface-S and for the tangential image surface T for each wavelength. In FIG. 3C, distortion is shown for the d-line. In FIG. 3D, lateral color is shown for both the C-line and the g-line relative to the d-line. The half-field angle ω for FIGS. 3B–3D is 24.1°. As is apparent from these figures, the various aberrations are favorably corrected.

Embodiment 3

Embodiment 3 is very similar to Embodiment 1 and uses the same number of lens elements. Because Embodiment 3 is very similar to Embodiment 1, the differences between Embodiment 3 and Embodiment 1 will be evident from Table 3 that follows.

Table 3 below lists the surface number # in order from the object side, the radius of curvature R (in mm) of each surface, the on-axis surface spacing D (in mm), the refractive index $N_d$ (at the d-line), the refractive index $N_g$ (at the g-line), the refractive index $N_F$ (at the F-line), the refractive index $N_C$ (at the C-line), the Abbe number $v_d$ (at the d-line), and the product name that the manufacturer (O'Hara) uses to identify the optical material used to make each lens element for Embodiment 3. Listed in the middle portion of Table 3 are the focal length f, the f-number $F_{NO}$, the magnification β, and the maximum field angle 2ω for Embodiment 3. Furthermore, listed in the bottom portion of Table 3 are the values corresponding to Conditions (1)–(5) for Embodiment 3.

TABLE 3

| # | R | D | $N_d$ | $N_g$ | $N_F$ | $N_C$ | $v_d$ | Optical Material |
|---|---|---|---|---|---|---|---|---|
| 1 | 22.93 | 1.92 | 1.61340 | 1.63091 | 1.62311 | 1.60925 | 44.3 | S-NBM51 |
| 2 | 14.65 | 0.63 | | | | | | |
| 3 | 14.80 | 11.27 | 1.48749 | 1.49596 | 1.49228 | 1.48534 | 70.2 | S-FSL5 |
| 4 | 30.45 | 5.41 | | | | | | |
| 5 | ∞(stop) | 2.10 | | | | | | |
| 6 | −50.54 | 1.59 | 1.51742 | 1.52980 | 1.52431 | 1.51444 | 52.4 | S-NSL36 |
| 7 | 30.89 | 12.74 | 1.71300 | 1.72943 | 1.72221 | 1.70897 | 53.9 | S-LAL8 |
| 8 | −23.47 | 1.40 | | | | | | |
| 9 | −18.83 | 1.84 | 1.54814 | 1.56335 | 1.55654 | 1.54457 | 45.8 | S-TIL1 |
| 10 | −67.67 | | | | | | | | f = 100 mm $F_{NO}$ = 6.0 β = −0.255 2ω = 48.2°
Condition (1) value: $R_1/f$ = 0.23
Condition (2) value: f2/f = 0.48
Condition (3) value: f3/f = 0.36
Condition (4) value: $R_8/R_9$ = 1.25
Condition (5) value: $θ_{gd}$ = 1.220 ($v_d$ = 70.2)

Embodiment 3 satisfies Conditions (1)–(5).

Figures 4A, 4B, 4C, 4D:
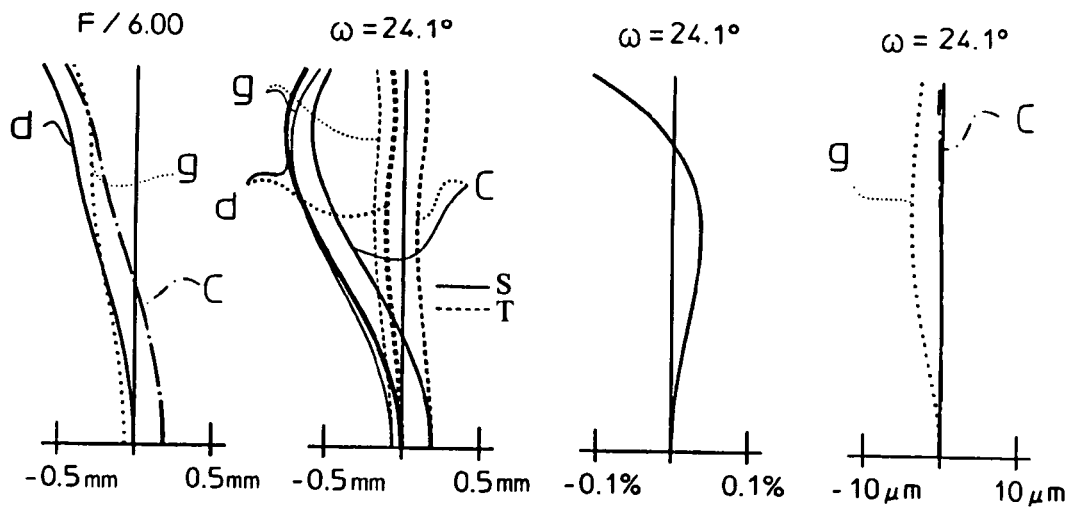
FIGS. 4A–4D show the spherical aberration, astigmatism, distortion, and lateral color, respectively, of the image scanning lens according to Embodiment 3.

FIGS. 4A–4D show the spherical aberration, astigmatism, distortion, and lateral color, respectively, of the image scanning lens of Embodiment 3. These aberration diagrams are based on the focal length being 100 mm and a plane parallel glass plate with a thickness of 5.85 mm being arranged in the optical path on the object side of the image scanning lens as well as a plane parallel glass plate with a thickness of 1.46 mm being arranged in the optical path on the image side of the image scanning lens. As shown in FIG. 4A, the spherical aberration is shown at an f-number, $F_{NO}$, of 6.00. In FIGS. 4A and 4B, aberrations are shown for the d-line, the g-line, and the C-line. In FIG. 4B, the astigmatism is shown for the sagittal image surface S and for the tangential image surface T for each wavelength. In FIG. 4C, distortion is shown for the d-line. In FIG. 4D, lateral color is shown for both the C-line and the g-line relative to the d-line. The half-field angle ω for FIGS. 4B–4D is 24.1°. As is apparent from these figures, the various aberrations are favorably corrected.

Embodiment 4

Embodiment 4 is very similar to Embodiment 1 and uses the same number of lens elements. Because Embodiment 4 is very similar to Embodiment 1, the differences between Embodiment 4 and Embodiment 1 will be evident from Table 4 that follows.

Table 4 below lists the surface number # in order from the object side, the radius of curvature R (in mm) of each surface, the on-axis surface spacing D (in mm), the refractive index $N_d$ (at the d-line), the refractive index $N_g$ (at the g-line), the refractive index $N_F$ (at the F-line), the refractive index $N_C$ (at the C-line), the Abbe number $v_d$ (at the d-line), and the product name that the manufacturer (O'Hara) uses to identify the optical material used to make each lens element for Embodiment 4. Listed in the middle portion of Table 4 are the focal length f, the f-number $F_{NO}$, the magnification β, and the maximum field angle 2ω for Embodiment 4. Furthermore, listed in the bottom portion of Table 4 are the values corresponding to Conditions (1)–(5) for Embodiment 4.

TABLE 4

| # | R | D | $N_d$ | $N_g$ | $N_F$ | $N_C$ | $v_d$ | Optical Material |
|---|---|---|---|---|---|---|---|---|
| 1 | 26.73 | 1.92 | 1.65412 | 1.67517 | 1.66571 | 1.64923 | 39.7 | S-NBH5 |
| 2 | 16.21 | 0.69 | | | | | | |
| 3 | 16.62 | 12.04 | 1.62041 | 1.63315 | 1.62757 | 1.61728 | 60.3 | S-BSM16 |
| 4 | 29.98 | 4.47 | | | | | | |
| 5 | ∞(stop) | 4.11 | | | | | | |
| 6 | −51.56 | 1.69 | 1.51742 | 1.52980 | 1.52431 | 1.51444 | 52.4 | S-NSL36 |
| 7 | 32.18 | 10.78 | 1.69680 | 1.71234 | 1.70552 | 1.69297 | 55.5 | S-LAL14 |
| 8 | −21.81 | 1.02 | | | | | | |
| 9 | −18.82 | 1.94 | 1.66672 | 1.68412 | 1.67639 | 1.66259 | 48.3 | S-BAH11 |
| 10 | −48.58 | | | | | | | | f = 100 mm $F_{NO}$ = 6.0 β = −0.255 2ω = 48.2°
Condition (1) value: $R_1/f$ = 0.27
Condition (2) value: f2/f = 0.45
Condition (3) value: f3/f = 0.35
Condition (4) value: $R_8/R_9$ = 1.16
Condition (5) value: $θ_{gd}$ = 1.238 ($v_d$ = 60.3)

Embodiment 4 satisfies Conditions (1)–(4).

Figures 5A, 5B, 5C, 5D:
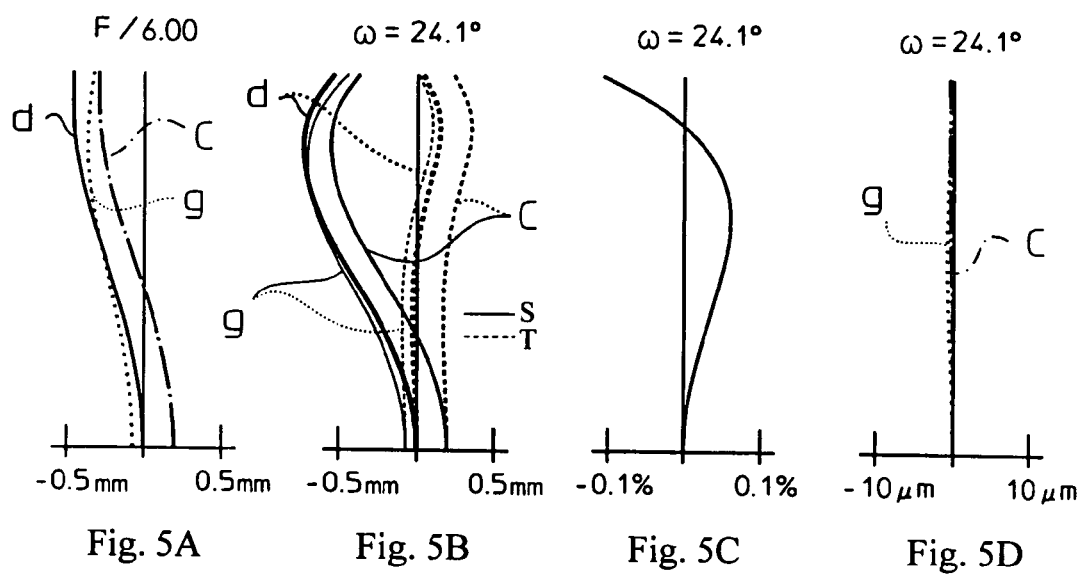
FIGS. 5A–5D show the spherical aberration, astigmatism, distortion, and lateral color, respectively, of the image scanning lens according to Embodiment 4.

FIGS. 5A–5D show the spherical aberration, astigmatism, distortion, and lateral color, respectively, of the image scanning lens of Embodiment 4. These aberration diagrams are based on the focal length being 100 mm and a plane parallel glass plate with a thickness of 5.85 mm being arranged in the optical path on the object side of the image scanning lens as well as a plane parallel glass plate with a thickness of 1.46 mm being arranged in the optical path on the image side of the image scanning lens. As shown in FIG. 5A, the spherical aberration is shown at an f-number, $F_{NO}$, of 6.00. In FIGS. 5A and 5B, aberrations are shown for the d-line, the g-line, and the C-line. In FIG. 5B, the astigmatism is shown for the sagittal image surface S and for the tangential image surface T for each wavelength. In FIG. 5C, distortion is shown for the d-line. In FIG. 5D, lateral color is shown for both the C-line and the g-line relative to the d-line. The half-field angle ω for FIGS. 5B–5D is 24.1°. As is apparent from these figures, the various aberrations are favorably corrected.

The present invention is not limited to the aforementioned embodiments, as it will be obvious that various alternative implementations are possible. For instance, values such as the radius of curvature R of each of the lens elements, the surface spacings D, the refractive indexes $N_d$, $N_g$, $N_F$, and $N_C$, as well as the Abbe number $v_d$, are not limited to the examples indicated in each of the aforementioned embodiments, as other values can be adopted Additionally, for example, either or both of the above described lens elements $L_3$ and $L_4$ can be so constructed so as to have their surface of stronger curvature on the object side. Furthermore, the image scanning lens of the present invention may be used in various image scanning devices. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An image scanning lens comprising, in order from the object side with no intervening lens element:
   a first lens component having negative refractive power and a meniscus shape with its convex surface on the object side;
   a second lens component having positive refractive power and a meniscus shape with its convex surface on the object side;
   a stop;
   a third lens component including, in order from the object side, a biconcave lens element and a biconvex lens element; and
   a fourth lens component having negative refractive power and a meniscus shape with its concave surface on the object side.

2. The image scanning lens of claim 1, wherein each of said first lens component, said second lens component, and said fourth lens component is formed of a single lens element, and said biconcave lens element and said biconvex lens element are cemented together.

3. The image scanning lens of claim 1, wherein the image scanning lens is formed of only four lens components and said stop.

4. The image scanning lens of claim 3, wherein each of said first lens component, said second lens component, and said fourth lens component is formed of a single lens element, and said biconcave lens element and said biconvex lens element are cemented together.

5. The image scanning lens of claim 1, wherein the following conditions are satisfied:

$0.22 < R_1/f < 0.28$ $0.40 < f2/f < 0.51$ $0.33 < f3/f < 0.42$ $1.14 < R_8/R_9 < 1.31$ where
   $R_1$ is the radius of curvature of the object-side surface of said first lens component,
   f is the focal length of the image scanning lens,
   f2 is the focal length of said second lens component, f3 is the focal length of said third lens component, $R_8$ is the radius of curvature of the image-side surface of said third lens component, and $R_9$ is the radius of curvature of the object-side surface of said fourth lens component.

6. The image scanning lens of claim 5, wherein each of said first lens component, said second lens component, and said fourth lens component is formed of a single lens element, and said biconcave lens element and said biconvex lens element are cemented together.

7. The image scanning lens of claim 5, wherein the image scanning lens is formed of only four lens components and said stop.

8. The image scanning lens of claim 7, wherein each of said first lens component, said second lens component, and said fourth lens component is formed of a single lens element, and said biconcave lens element and said biconvex lens element are cemented together.

9. The image scanning lens of claim 5, in combination with an image scanning device that includes an image pickup device for receiving an image formed by the image scanning lens.

10. The image scanning lens of claim 1, wherein:

said second lens component includes a lens element having positive refractive power and a meniscus shape with its convex surface on the object side; and the following condition is satisfied:

$\theta_{gd} > -2.083 \cdot 10^{-3} \cdot v_d + 1.366$ for said lens element of said second lens component, where $\theta_{gd} = (N_g - N_d)/(N_F - N_C)$, $N_g$ is the refractive index at the g-line ($\lambda$=435.83 nm) of the lens material of said lens element of said second lens component, $N_d$ is the refractive index at the d-line ($\lambda$=587.56 nm) of the lens material of said lens element of said second lens component, $N_F$ is the refractive index at the F-line ($\lambda$=486.13 nm) of the lens material of said lens element of said second lens component, $N_C$ is the refractive index at the C-line ($\lambda$=656.27 nm) of the lens material of said lens element of said second lens component, and $v_d$ is the Abbe number at the d-line (587.56 nm) of the lens material of the lens element of the second lens component.

11. The image scanning lens of claim 10, wherein each of said first lens component, said second lens component, and said fourth lens component is formed of a single lens element, and said biconcave lens element and said biconvex lens element are cemented together.

12. The image scanning lens of claim 10, wherein the image scanning lens is formed of only four lens components and said stop.

13. The image scanning lens of claim 12, wherein each of said first lens component, said second lens component, and said fourth lens component is formed of a single lens element, and said biconcave lens element and said biconvex lens element are cemented together.

14. The image scanning lens of claim 10, wherein the following conditions are satisfied:

$0.22 < R_1/f < 0.28$ $0.40 < f2/f < 0.51$ $0.33 < f3/f < 0.42$ $1.14 < R_8/R_9 < 1.31$ where $R_1$ is the radius of curvature of the object-side surface of said first lens component, f is the focal length of the image scanning lens, f2 is the focal length of said second lens component, f3 is the focal length of said third lens component, $R_8$ is the radius of curvature of the image-side surface of said third lens component, and $R_9$ is the radius of curvature of the object-side surface of said fourth lens component.

15. The image scanning lens of claim 14, wherein each of said first lens component, said second lens component, and said fourth lens component is formed of a single lens element, and said biconcave lens element and said biconvex lens element are cemented together.

16. The image scanning lens of claim 14, wherein the image scanning lens is formed of only four lens components and said stop.

17. The image scanning lens of claim 15, wherein each of said first lens component, said second lens component, and said fourth lens component is formed of a single lens element, and said biconcave lens element and said biconvex lens element are cemented together.

18. The image scanning lens of claim 14, in combination with an image scanning device that includes an image pickup device for receiving an image formed by the image scanning lens.

19. The image scanning lens of claim 10, in combination with an image scanning device that includes an image pickup device for receiving an image formed by the image scanning lens.

20. The image scanning lens of claim 1, in combination with an image scanning device that includes an image pickup device for receiving an image formed by the image scanning lens.

* * * * *